(12) United States Patent
Seil

(10) Patent No.: US 6,722,628 B1
(45) Date of Patent: Apr. 20, 2004

(54) MINIATURE POPPET VALVE ASSEMBLY

(75) Inventor: Michael G. Seil, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 0 days.

(21) Appl. No.: 10/361,135

(22) Filed: Feb. 6, 2003

(51) Int. Cl.$^7$ ............................................... F16K 31/02
(52) U.S. Cl. ............................ 251/129.15; 251/129.01
(58) Field of Search ........................ 251/129.01–129.22

(56) References Cited

U.S. PATENT DOCUMENTS

| | | |
|---|---|---|
| 3,570,806 A | 3/1971 | Sturman et al. |
| 3,683,239 A | 8/1972 | Sturman |
| 3,743,898 A | 7/1973 | Sturman |
| 4,018,419 A | 4/1977 | Monpetit |
| 4,323,003 A | 4/1982 | Clippard, III |
| 4,409,638 A | 10/1983 | Sturman et al. |
| 5,127,625 A | 7/1992 | Kleinhappl |
| 5,251,659 A | 10/1993 | Sturman et al. |
| 5,301,875 A | 4/1994 | Gant et al. |
| 5,304,971 A | 4/1994 | Sturman et al. |
| 5,407,131 A | 4/1995 | Maley et al. |
| 5,483,411 A | 1/1996 | Sturman et al. |
| 5,494,219 A | 2/1996 | Maley et al. |
| 5,584,465 A | 12/1996 | Ochsenreiter |
| 5,584,466 A | 12/1996 | Fukano et al. |
| 5,640,987 A | 6/1997 | Sturman |
| 5,641,148 A | 6/1997 | Pena et al. |
| 5,711,347 A | 1/1998 | Sturman et al. |
| 5,718,264 A | 2/1998 | Sturman |
| 5,836,230 A | 11/1998 | Sturman |
| 5,954,030 A | 9/1999 | Sturman et al. |
| 5,961,052 A * | 10/1999 | Coldren et al. ......... 251/129.02 |
| 6,035,895 A | 3/2000 | Grill et al. |
| 6,036,120 A * | 3/2000 | Varble et al. .......... 251/129.01 |
| 6,079,435 A * | 6/2000 | Franz et al. ........... 251/129.08 |
| 6,116,276 A | 9/2000 | Grill |
| 6,129,115 A | 10/2000 | Janssen et al. |
| 6,220,569 B1 | 4/2001 | Kelly |
| 6,234,202 B1 | 5/2001 | Grill |
| 6,386,218 B1 * | 5/2002 | Ness et al. ............. 137/625.26 |
| 6,644,622 B2 * | 11/2003 | Modien ................. 251/129.15 |

OTHER PUBLICATIONS

Clippard Instrument Laboratory, Inc., "Parting Thoughts", Fluid Power Journal, Nov./Dec. 2002, p. 40, Palmer, PA.

* cited by examiner

*Primary Examiner*—Paul J. Hirsch
(74) *Attorney, Agent, or Firm*—Blakely, Sokoloff, Taylor & Zafman LLP

(57) ABSTRACT

Fluid valves suitable for manufacture as a miniature poppet valve assembly. The valves include an upper pole piece, a lower pole piece and an armature, all formed of magnetic material. The upper and lower pole pieces are permanently joined such as by a press fit to entrap an electromagnetic actuator coil and form the magnetic circuit for a moveable armature assembled therein. A valve seat member is molded to, presses, snaps or barbs onto the lower pole piece entrapping the armature and armature return spring to complete the assembly. Use of intended permanent assemblies and use of the parts of the magnetic circuit as the valve outer housing or case allows realization of valves in relatively smaller sizes and capable of relatively higher speeds and frequencies of operation than could be practically provided using valves of other designs or using other assembly techniques.

25 Claims, 4 Drawing Sheets

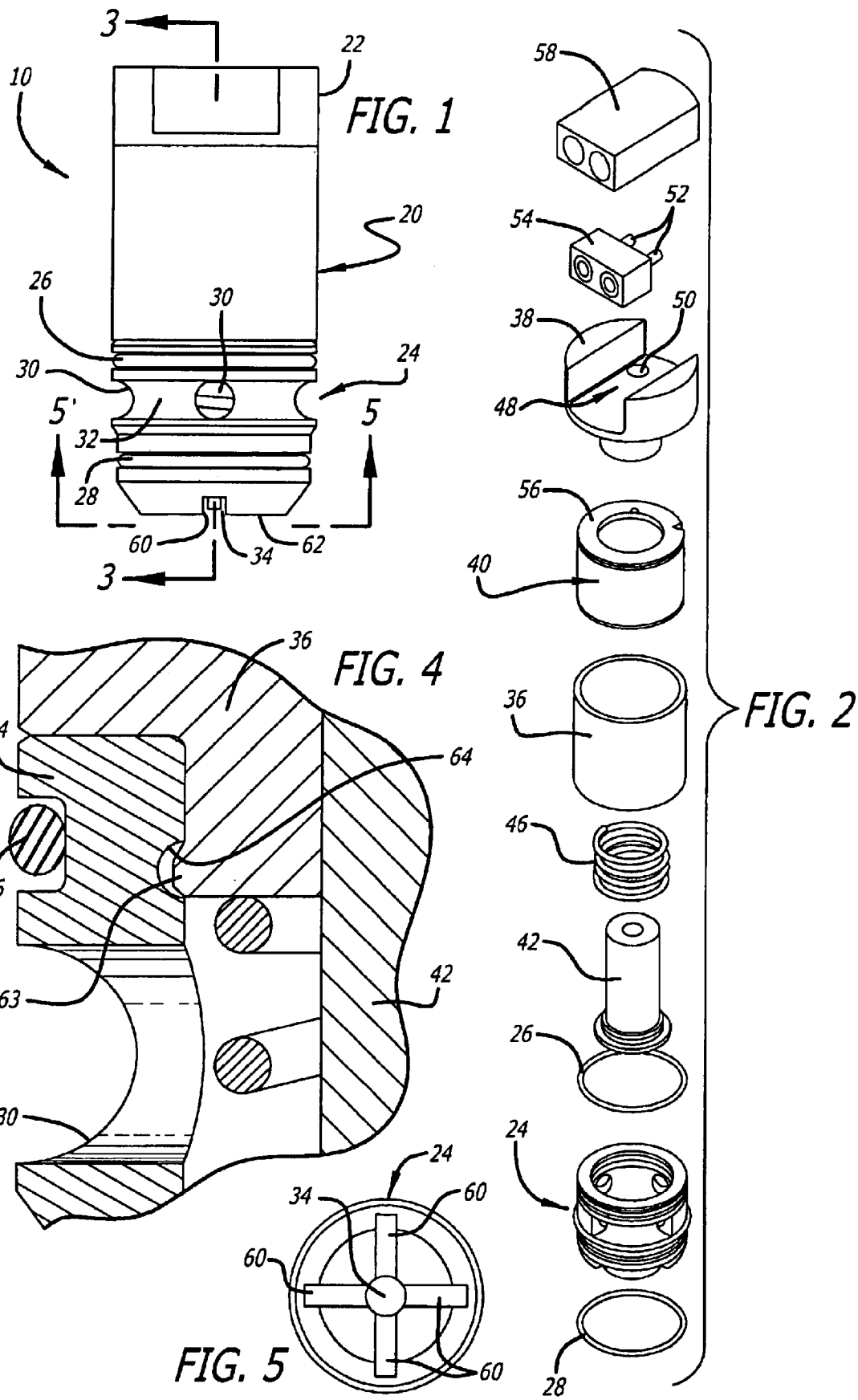

MINIATURE POPPET VALVE ASSEMBLY

BACKGROUND OF THE INVENTION

1. Field of the Invention

The present invention relates to the field of electromagnetically operated pneumatic poppet valves.

2. Prior Art

Poppet valves of various designs are well known in the prior art. Such valves are characterized by a valve member that is moveable in a direction generally perpendicular to the plane of a valve seat between a valve open position and a valve closed position. Of particular importance to the present invention are solenoid actuated poppet valves. Such valves have an actuator coil which when electrically energized, will move the valve member to the valve open (or closed) position, with a mechanical return spring returning the valve member to the valve closed (or open) position when the magnetic circuit is de-energized.

The configuration and construction of solenoid actuated poppet valves various widely dependent upon the intended application of the valves and various choices made during the valve design phase. However, two general forms of construction, either or both of which may be incorporated into a single valve design, are commonly used. In one conventional construction, various parts are threaded together or held together by complementary threaded members that in some cases allow for disassembly, reassembly, and even replacement of parts in the field. In another conventional construction, the various parts are contained within some encapsulating form of enclosure, configured in such a way as to be tamper-proof or not readily disassembled in the field. This latter construction is more commonly used in smaller poppet valves wherein the cost of repairing the same valve may exceed the cost of replacement. Still, such valves that do not pass final inspection in the manufacturing process can be disassembled at the factory for troubleshooting purposes, recovery of parts therein, etc.

The present invention is a poppet valve suitable for manufacture in miniature form and capable of very high speed operation wherein neither of the foregoing conventional constructions is practical due to the penalties the added mass required of a valve which may be disassembled impose on its response capability.

BRIEF SUMMARY OF THE INVENTION

Valves suitable for manufacture as a miniature poppet valve are disclosed. The valves might include, minimally, an upper pole piece, a lower pole piece and an armature, all of magnetic material. The two pole pieces are permanently joined such as by a press fit, welding and/or by an adhesive to entrap an actuator coil and form the magnetic circuit for an armature assembled therein. A valve seat member is molded to, snaps or barbs onto the armature piece and is entrapped by the armature to complete the assembly. Use of intended permanent assemblies and use of the parts of the magnetic circuit as the valve outer housing or case allows realization of valves of smaller, lower mass and higher speed capability than could be practically provided using valves of other designs or using other assembly techniques.

BRIEF DESCRIPTION OF THE DRAWINGS

FIG. 1 is a first side view of one embodiment of miniature poppet valve in accordance with the present invention.

FIG. 2 is an exploded perspective view of the miniature poppet valve of FIG. 1.

FIG. 4 is an enlarged partial view of region 4 of FIG. 3.

FIG. 5 is an end view of the miniature poppet valve taken along line 5—5 of FIG. 1.

DETAILED DESCRIPTION OF THE PREFERRED EMBODIMENTS

Figure 3:
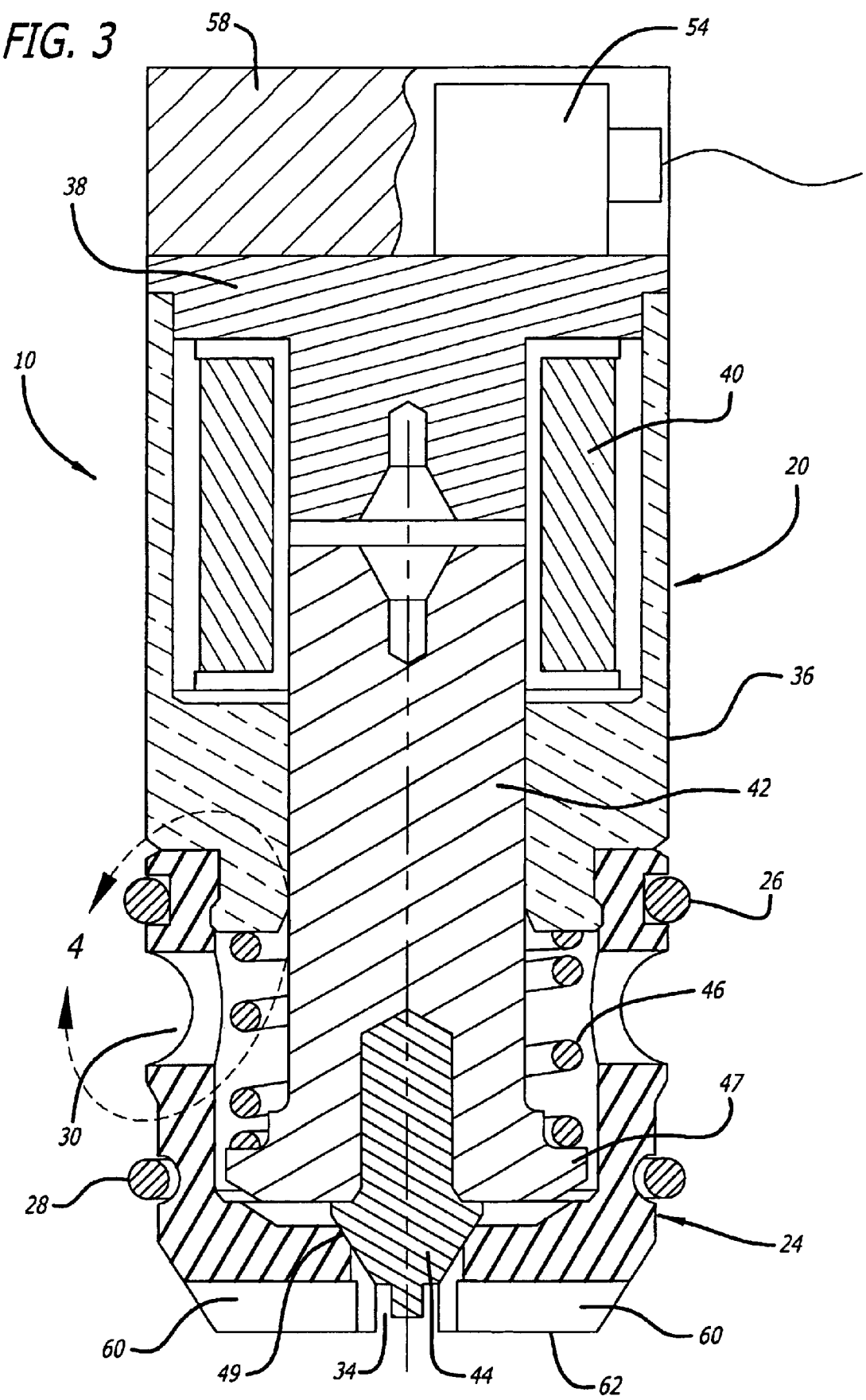
FIG. 3 is a cross sectional view of the miniature poppet valve taken along line 3—3 of FIG. 1.

The present invention is a miniature electromagnetically operated pneumatic poppet valve assembly 10 having a unique construction facilitating its small size and low mass. In a particular preferred embodiment disclosed in detail herein, the poppet valve assembly 10 is of the two-way, two position type of fluid valve. The valve body is approximately 0.35 inches (10 millimeters) in diameter and approximately 0.75 inches (19 millimeters) long. In this embodiment, the major parts of the poppet valve assembly 10, including an armature assembly, a return spring, two stationary parts of the magnetic circuit, a valve seat member and an electromagnetic actuator coil, are assembled using one press fit for the two major components of the magnetic circuit, and a single "snap" or press or barb fit, or a combination of the foregoing, of the valve seat to the foregoing assembly. A potting operation then secures the actuator coil and a printed circuit board connector in position, completing the assembly. The sealing tip is directly molded to the armature in the embodiment shown in FIGS. 3 and 6, allowing for low mass and space conservation in the valve interior. The result is a press-fit assembly directly connected to a printed circuit board without wires, and with the poles themselves forming the upper portion of the enclosure, and in the preferred embodiment, being generally intended to be tamper-proof even at the time of manufacture.

Now referring to FIG. 1, a side view of a preferred embodiment of the present invention may be seen. The miniature poppet valve assembly 10 of the embodiment shown therein has a cylindrical body 20, an end cap assembly 22 and a valve seat member 24. The valve seat member 24 has an O-ring or other sealing member 26 positioned in an O-ring groove therein and a second O-ring or still other sealing member 28, also positioned in an O-ring groove therein, with one or more (e.g., four) ports 30 defined through a recessed section 32 of the valve seat member 24 between O-rings 26 and 28 providing fluid communication with the inside of the valve seat member 24. Also defined at the bottom of the valve seat member 24 is a second port, generally indicated by the numeral 34, details of which are better described with respect to subsequent Figures. Assembly of the valve, in itself, preloads the tip to port to form the sealed enclosure.

Referring now to FIG. 3, a cross-sectional view of the miniature poppet valve assembly 10 of FIGS. 1 and 2 may be seen. The cylindrical body 20 shown in FIG. 1 is actually the lower pole piece 36 of FIGS. 2 and 3, which together with upper pole piece 38 forms most or a substantial portion of the outer enclosure of the poppet valve assembly 10 as well the stationary part of the magnetic circuit, entrapping the electromagnetic actuator coil 40 therein. Positioned within the lower pole piece 36 is a movable armature 42 having a valve closure member 44 integrated at the lower end thereof. The valve closure member, preferably formed of a compliant and/or lighter weight rubber or plastic material, such as Nitrile or Viton, may be molded into, or pressed, cemented or otherwise connected to the armature 42. A return spring 46, acting between the lower pole piece 36 and an annular shoulder 47 formed on the lower end of the armature, biases the armature to the valve closed position shown in FIG. 3, cutting off fluid communication between port 34 and ports 30. Electrical excitation of the actuator coil 40, however, will provide a magnetic attractive force on the upper end of the armature to pull the armature flat against the adjacent surface of the upper pole piece 38, pulling the valve closure member 44 away from the adjacent valve seat 49 in the valve seat member 24 to establish fluid communication between port 34 and port(s) 30. The "pressing" and/or welding of members 38, 36 and 24 create a "leak free" valve so that all fluid that passes through 34 exits through 30.

Details of the end cap assembly 22 (FIG. 1), which includes the upper pole piece 38, may be seen in the exploded view of FIG. 2. The upper pole piece 38 in this embodiment has a relatively large slot 48 formed across the top thereof, with two holes 50 there through (only one being visible in FIG. 2) for the two electrical lead wires (not shown) of the actuator coil 40. These leads are connected to terminals 52, forming a miniature connector 54 fitting within slot 48 in the upper pole piece 38. In that regard, the coil 40 may be wound on a fixture without a bobbin or, as in a preferred embodiment, a bobbin such as bobbin 56 (FIG. 2) may be used.

The connector 54 fits within slot 48 in the upper pole piece 38, with the rest of the slot being potted, typically with a suitable thermosetting resin to retain the connector, encapsulate the lead wires for coil 40 and to bond the bobbin 56 in place through holes 50 in the upper pole piece 38 so as to prevent any movement of the actuator coil 40 in the final assembly. The potting, generally illustrated by the numeral 58 in FIG. 2, may be done in a fixture, or alternatively, in a preformed cap, such as an injection molded cap generally in the shape shown, may be used, both as the potting fixture for each respective poppet valve and as a permanent part of the valve. Preferably, the cap and/or the potting is confined to the slot 48 (FIG. 2). After potting, the valve can be directly (with pins) connected to a printed circuit board. No wires or intermediate connectors are needed.

Now referring to FIG. 5, a bottom view of the valve seat member 24 may be seen. The valve seat member has an opening or port 34 (see also FIGS. 1 and 3), terminating at the inner end thereof to form a valve seat cooperatively disposed with respect to the valve closure member 44. Extending in multiple (e.g., four) radial directions from the port 34 are slots 60 (see FIGS. 1, 3 and 5), formed in the valve seat member 24 to provide fluid flow passages communicating with the port 34, even if the poppet valve assembly 10 is used in an application having the end 62 thereof flat against a mounting surface for the valve. These slots further serve to reduce the length of the valve by making the fluid passage an integral part of the seat.

Referring now to FIG. 4, details of the area 4—4 of FIG. 3 may be seen. The lower edge of the lower pole piece 36 has a relatively small annular protrusion 62 formed at the lower end thereof. The valve seat member 24 has a cooperatively disposed annular recess 64 for receiving and retaining the annular protrusion 62 on the lower pole piece 36. In the preferred embodiment, valve seat member 24 is a molded non-metallic member having sufficient compliance to allow pressing of the lower end of the lower pole piece 36 into the top of the valve seat member to provide a tight snap fit of these two pieces. Delrin material is used in one embodiment.

The lower pole piece 36, the upper pole piece 38 and the armature 42 are formed of magnetic materials, typically but not necessarily, all the same material, and preferably a ferromagnetic material preferably selected in part to provide minimum wear characteristics and high magnetic hysteresis. While any of a number of materials may be used, one useful material is 4140 steel.

Now referring again to FIG. 2, for assembly purposes in this embodiment, the upper pole piece 38 and the lower pole piece 36 are dimensioned to provide a press fit there between. Thus, with the actuator coil 40 in position (in the embodiment shown, already assembled as part of the end cap assembly 22), the upper pole piece 38 and the lower pole piece 36 may be permanently pressed together. If desired, a suitable bonding technique such as laser welding or an adhesive cement may used to enhance the joining of these two parts, or used as an alternative to a press fit. As a still further alternative, or in addition, the top of the lower pole piece 36 or the bottom of the upper pole piece 38 may be rolled into a slight groove provided for that purpose, though at least in some applications for reduced wear, the magnetic materials may be mechanically too hard for normal rolling operations. Whatever joining method is used, however, it is contemplated that this joint preferably be treated as a permanent joint, as the parts are too small and/or of relatively low cost to incorporate fasteners or fastening techniques allowing disassembly and reassembly as desired.

Once the upper pole piece 38 and lower piece 36 are permanently assembled, the armature assembly (armature 42 with valve closure member 44 thereon) and mechanical return spring 46 are put in position. Then, the valve seat member 24 is pressed onto the lower end of the lower pole piece 36 to "snap" into its final assembly position. The O-rings 26 and 28 are then typically added thereto. Obviously the O-rings facilitate a particular type of mounting, though other types of mounting and sealing of the valve may be incorporated as desired. By way of but one example, flange mounting with tube connections may be used, preferably by providing a flange on typically the lower pole piece 36 or the valve seat member 24. Alternatively, rubber could be molded to 34 in place of O-rings to form one piece.

The net result is a miniature solenoid-operated pneumatic valve assembly 10 having a minimum number of parts and permanently assembled, suitable for use in controlling the flow of gasses or liquids, depending on the application of the valve. In that regard, while the lower end of the armature 42 is shown are having an annular flange-like protrusion for capturing the return spring 46, the flange-like protrusion may be scalloped or otherwise discontinuous in regions to increase the internal fluid flow area within the valve seat member 24 and reduce viscous effects restraining flow and/or operation of the valve.

While it is not necessary to incorporate all features of any exemplary embodiment in a particular design, the lack of external connecting means or mechanisms, integrated armature and seat, use of non-metallics outside the magnetic circuit, and integrated printed circuit board connection combine with magnetic latching ability to allow a valve design with very low mass capable of high speed operation, with good resilience to high "g" loading.

The valve assemblies 10 of the present invention may be used for high speed control of fluid flow in either direction. If with the valve closed, the relatively higher fluid pressure is on port 34, then the return spring 46 must have an adequate force to hold the valve closure member 44 closed against its seat despite the differential pressure encouraging the valve closure member 44 towards the open position, yet not so high a force as to prevent overpowering the return spring 46 by the magnetic forces generated by the actuator coil 40 to open the valve. If with the valve closure member 44 closed, the relatively lower fluid pressure is on port 34, then the magnetic forces generated by the actuator coil 40 to open the valve closure member 44 must exceed the force holding the valve closure member 44 closed against the differential pressure across the valve closure member plus the force of the return spring. In some embodiments, the return spring is selected so that the actuator coil 40 may be pulsed with an electrical current pulse to open the valve closure member 44 against a differential fluid pressure helping to hold the valve closure member 44 closed. The armature 42 and valve closure member 44 are capable of very high speeds and frequencies of operation between their open and closed positions. After termination of the electrical current pulse, the residual magnetism of the components of the magnetic circuit provides an attractive magnetic force exceeding the return spring force in order to hold (i.e., magnetically latch) the armature 42 (and consequently, the valve closure member 44) open. This allows opening the valve for a substantial period of time using only a short electrical current pulse for maximum opening force. Electrical current pulses can therefore be used that would otherwise overheat and damage the actuator coil 40 if such an electrical current level was maintained throughout a substantial valve open period. This also reduces the size of the actuator coil drive circuitry needed. To close the valve once magnetically latched open, a short, lower amplitude electrical current pulse in the opposite direction may be used to substantially demagnetize the components of the magnetic circuit, thereby allowing the return spring to close the valve. Alternative embodiments may utilize a fast decaying sinusoid of current to cancel the latching force and allow the valve to close.

Also, while the embodiment disclosed herein is approximately 0.35 inches (10 millimeters) in diameter and approximately 0.75 inches (19 millimeters) long, similar designs and assembly techniques may be used for valves of other sizes, such as by way of example, valves of approximately 0.5 inch (13 millimeters) in diameter and approximately 1.0 inches (25 millimeters) long. Even larger valves may be made in accordance with the present invention, though particularly large valves are more amenable, physically and economically, to inclusion of reversible assembly techniques.

Figure 6:
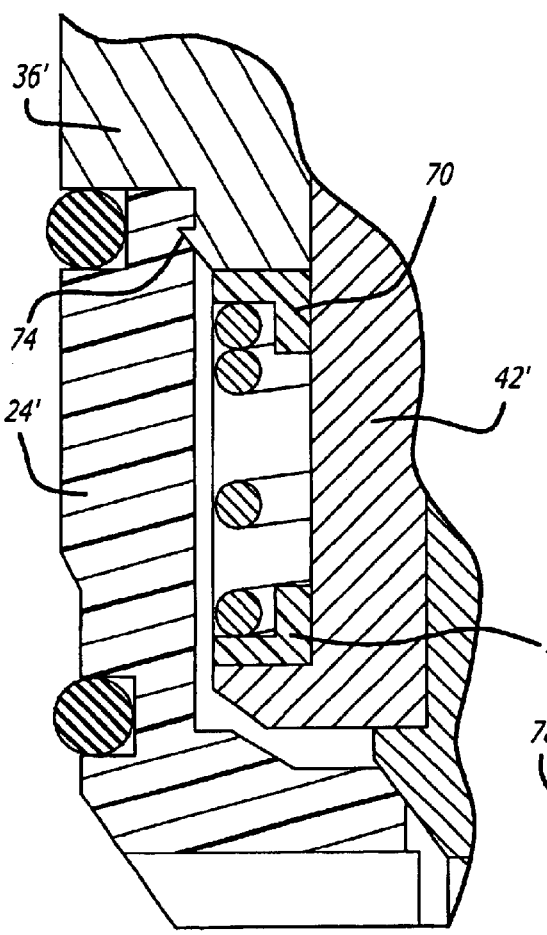
FIG. 6 is a local cross sectional view of an alternate embodiment of the present invention.

Now referring to FIG. 6, a cross-section similar to the cross-section of FIG. 4, but of an alternate embodiment, may be seen. This embodiment otherwise may be identical to the embodiment of FIGS. 1 through 5 and FIG. 7. In the embodiment of FIG. 6, plastic members 70 and 72 are interposed between spring 46 and lower pole piece 36, and spring 46 and moveable armature 42', respectively. These plastic members prevent metal-to-metal contact between the spring and the respective adjacent members and thereby avoid possible wear and formation of debris by any motion between the respective metal members.

In the embodiment of FIG. 6, the lower pole piece 36' has an integral barb 74 formed on the annular protrusion 76, which barb 74 has an interference fit with the inner diameter of the valve seat member 24'. In that regard, it will be noted that the cross-section of FIG. 6 is a cross-section similar to that of FIG. 4 for the prior embodiment, though taken at a 45° angle between ports 30, that is, halfway between ports 30 (see FIGS. 1, 3 and 4) in the valve seat member 24'. The section of FIG. 6 is taken at the 45° angle to illustrate the manner in which the barb 74, shown somewhat enlarged for clarity, bites into and locks with respect to the valve seat member 24' when the valve seat member 24' and the lower pole piece 36' are forced together during assembly to permanently hold the members together. The valve seat member 24' itself initially may or may not have a corresponding indentation, and accordingly, the barb will automatically seat with the parts at the fully assembled position. If desired, the setting of the barb may be aided by pressing or rolling, or by application of ultrasonic energy around the periphery of the valve seat member 24'. In the embodiment of FIG. 6, the inner diameter of the valve seat member 24' has molded-in vertical grooves in the regions of the ports 30 (FIG. 1) to provide a greater flow area through the valve, and accordingly, the barbs interact with the inner diameter of the valve seat member 24' only in the regions between the ports.

Figure 7:
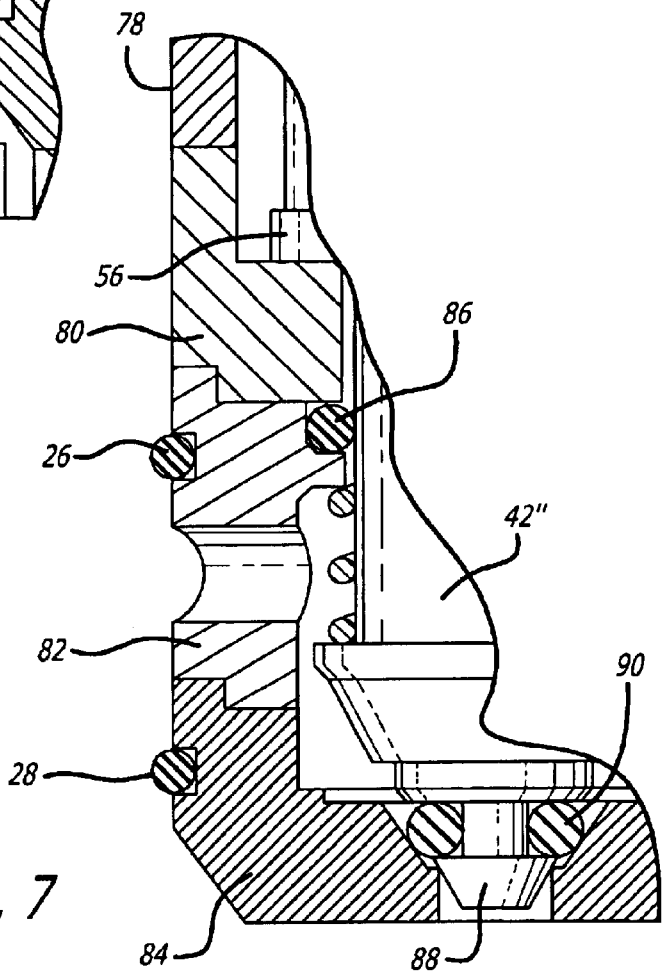
FIG. 7 is a local cross-sectional view of another alternate embodiment of the present invention.

Now referring to FIG. 7, a further embodiment of the present invention may be seen. In this embodiment, the upper pole piece 78 and lower pole piece 80 may be welded together using an appropriate fixture to maintain alignment of the two parts during welding. What was the valve seat member in the previous embodiments is comprised of two members 82 and 84, with member 80 having an O-ring 86 limiting or preventing airflow past the O-ring. The moveable armature 42" includes an integral lower umbrella-like protrusion 88 retaining elastomeric O-ring 90 providing the seal on valve closure. In this embodiment, members 82 and 84 and lower pole piece 80 may be fastened together using a press fit, though other forms of assembly of these parts, and/or of the upper and lower pole pieces may be used as desired.

Another aspect of the present invention is the ability to sense the arrival of the moveable armature 42 (or 42' or 42") at its actuated position. The principle allowing the sensing can be shown as follows. Assume for the moment that the resistance of the actuator coil 40 (see FIGS. 2 and 3) is a particular value, the permeability of the magnetic circuit is very high, and saturation and leakage effects are neglected. In a circuit wherein the inductance of an ideal coil changes depending on circuit geometry, the voltage e across the inductance L as a function of the current i in the inductor at any time t is given by the equation:

$$e = \frac{d}{dt}(Li) = L\frac{di}{dt} + i\frac{dL}{dt}$$

The inductance of the coil will be:

$$L = k/x = kx^{-1}$$

Where: k=a constant
x=the gap in the magnetic circuit
The rate of change of the inductance with time t is:

$$\frac{dL}{dt} = -kx^{-2}\frac{dx}{dt}$$

Thus:

$$e = L\frac{di}{dt} + i\frac{dL}{dt} = L\frac{di}{dt} - ikx^{-2}\frac{dx}{dt}$$

Note that on actuation (applying a voltage e to the actuator coil 40), the gap x will decrease, diminishing toward substantially zero, and the current i will initially increase from zero. Consequently, dx/dt will be negative during actuator motion, so that the dL/dt term will be positive, and increasing. If the dL/dt term exceeds the applied voltage e, then di/dt will become negative during part of the actuator motion. When the gap becomes substantially zero, the armature will stop. Now the dL/dt term becomes zero, so that, with the prior assumptions, the rate of change of current (di/dt) again becomes positive as follows:

$$e = L\frac{di}{dt}$$

Figure 8:
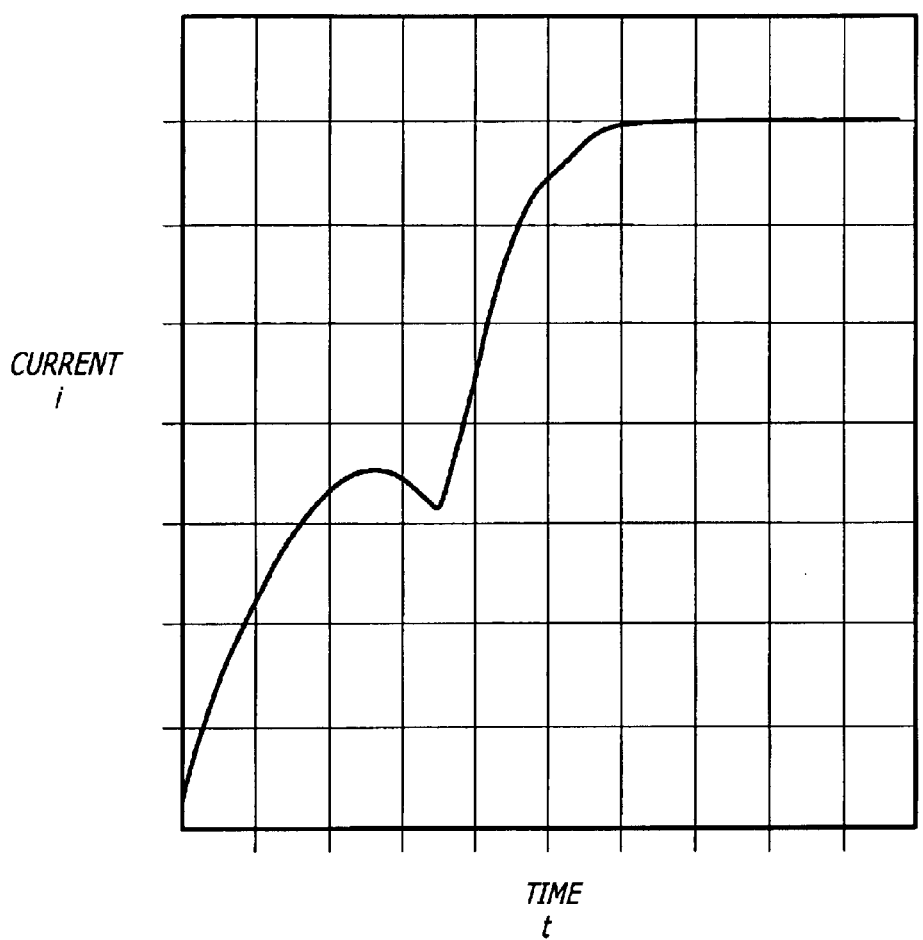
FIG. 8 is a copy of an actual trace of current versus time during the actuation of a valve in accordance with the present invention.

Now referring to FIG. 8, a copy of an actual trace showing current waveform versus time during the actuation of a valve in accordance with the present invention may be seen. The decreasing di/dt during the initial motion, actually later becoming negative, is very evident. Also very evident is the end of the actuator travel, at which point di/dt reverses, to decay to a steady state actuation current limited by the resistance of the coil (or by other means).

The rate of change of current in the actuator (di/dt) can easily be sensed by various means. By way of example, one may sense the current in the coil, such as by a series resistor, and with analog circuitry, sense the sudden change in di/dt by sensing $d^2i/dt^2$ using a pair of series connected differentiating circuits. The sudden change in di/dt from a substantial negative value to a very substantial positive value will exhibit itself as a large spike in $d^2i/dt^2$. It may also be sensed by peak detectors by sensing the first peak in the current to enable a second detector to detect the following minimum current.

In other configurations and applications, the dL/dt term may not become larger than the applied voltage before the actuator reaches the actuated position. However, even then, the di/dt term will decrease (but not go negative) until the actuator reaches the actuated position, after which the di/dt term will take a step jump to a more positive value. Consequently, the arrival of the actuator at the actuated position is indicated by a sudden increase in the di/dt term after actuation has begun, again indicated by a spike in $d^2i/dt^2$. In either case, the indication of arrival may be used to terminate the power to the valve if magnetic latching is used, typically after allowing for a possible debounce time. Otherwise, if the spring force exceeds any magnetic latching tendency, the actuation current may be reduced to a much lower holding current. This reduces power consumption and allows an overdrive of the coil, if desired or needed for speed purposes, without overheating the coil. Sensing full actuation in this manner can also be used for diagnostic purposes by noting an increase or irregularity in the actuation times of each valve.

Figure 9:
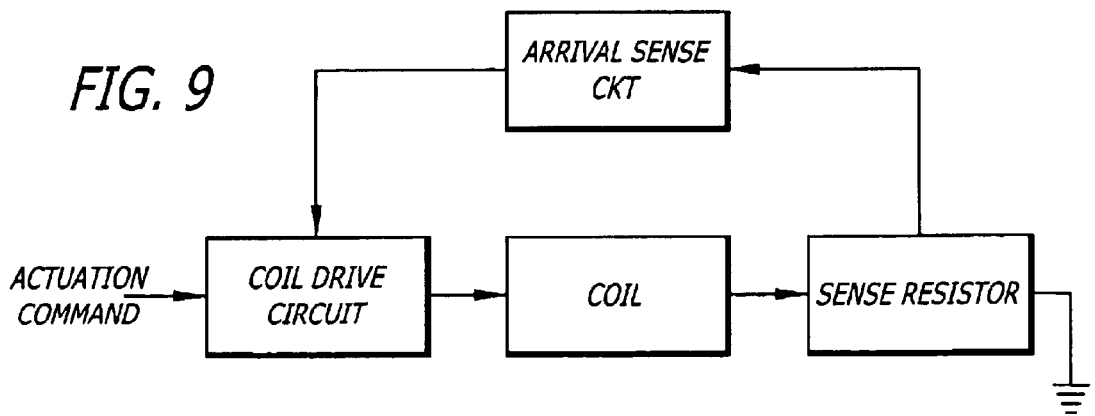
FIG. 9 is a block diagram of an exemplary coil drive system incorporating arrival sensing circuitry.

A block diagram for an exemplary coil excitation control circuit incorporating this feature may be seen in FIG. 9. The actuation command is provided to the coil drive circuit, which provides electrical power to a series combination of the coil and a sense resistor, the sense resistor being between the coil and ground for convenience. The arrival sense circuit senses the voltage across the sense resistor to determine the arrival of the moveable armature 42 (42', 42") at the actuated position, and provides a feedback signal, preferably after an adequate debounce time, to turn off the coil drive if magnetic latching is used, or to reduce the output of the coil drive circuit if magnetic latching is not used, in which case termination of the holding current releases the moveable armature 42 (42', 42").

Certain preferred embodiments of the present invention have been described in detail herein which incorporate numerous features which can be used to yield miniature valves capable of a high operating frequency (such as up to 1000 Hz), have a fast response (such as 0.4 to 0.6 msec), have a low power consumption (such as 0.125 watts when operating at 100 Hz), are small in size and have low leakage (the values in parenthesis are representative values for a exemplary magnetically latching valve, and do not necessarily represent the limit in performance that may be obtained). It is to be understood, however, that it is not necessary to incorporate all features in each embodiment of the invention, as individual features and sub-combinations of features may be advantageously combined as desired. For instance, use of permanent assembly techniques are preferred, though semi-permanent techniques may also be used if desired. Also, the sensing of completion of actuation is advantageous, though not indispensable in the practice of the present invention, and alternatively may be practiced with valves other than those otherwise in accordance with the present invention. Thus the foregoing description is intended to be illustrative only and not by way of limitation of the invention, as numerous further alternative embodiments in accordance with the invention will be apparent to those skilled in the art. Thus while certain preferred embodiments of the present invention have been disclosed herein, it will be obvious to those skilled in the art that various changes in form and detail may be made in the invention without departing from the spirit and scope of the invention as set out in the full scope of the following claims.

What is claimed is:

1. A fluid valve assembly comprising:

an electrical actuator coil having a bore;

an upper pole piece, a lower pole piece having a bore, and an armature, all formed of magnetic materials;

the upper and lower pole pieces being permanently joined outside an outer diameter of the actuator coil to form at least a part of the outer case of the valve assembly and to encircle the outer diameter of the actuator coil with magnetic material;

the armature having an outer peripheral surface sliding within the bore of the lower end of the lower pole piece, the armature being configured to slide upward within the bore of the lower end of the lower pole piece and into the bore of the actuator coil to a retracted position wherein an upper face of the armature abuts a cooperatively disposed face of the upper pole member;

a valve seat member permanently coupled to the lower end of the lower pole piece, the valve seat member defining a valve seat facing a lower end portion of the armature and defining a first port there through, the valve seat member also defining at least one second port;

the lower end of the armature having a valve closure member disposed to engage and seal with respect to the valve seat when the armature is in an extended position; and, a return spring disposed between the armature and the lower pole piece and preloaded to encourage the armature toward the extended position with the valve, closure member engaging and sealing against the valve seat.

2. The valve of claim 1 wherein the valve closure member is retained in the armature and projects downward to engage and seal with respect to the valve seat.

3. The valve of claim 1 wherein the valve closure member is an O-ring retained by an extension of the armature.

4. The valve of claim 1, wherein the upper and lower pole pieces are press fitted together.

5. The valve of claim 1, wherein the upper and lower pole pieces are bonded together.

6. The valve of claim 1, wherein the upper and lower pole pieces are press fitted and cemented together.

7. The valve of claim 1, wherein the valve seat member is formed of a plastic material.

8. The valve of claim 7, wherein the valve seat member is permanently coupled to the lower end of the lower pole piece by a snap fit.

9. The valve of claim 1, further comprised of an electrical connector on the top of the upper pole piece and coupled to the actuator coil.

10. The valve of claim 9, wherein the connector is molded into the top of the upper pole piece.

11. The valve of claim 1, wherein the return spring, when the armature is in the extended position, has a spring force greater than needed to keep the valve closure member engaging the valve seat against differential fluid pressures across the valve seat during use, and when in the retracted position, a spring force less than the force resulting from residual magnetism in the upper and lower pole pieces and the armature, allowing the armature to magnetically latch in the armature retracted position.

12. The valve of claim 1, wherein the upper pole piece, the lower pole piece and the armature are formed of 4140 steel alloy material.

13. The valve of claim 1, wherein the fluid valve assembly is less than approximately 1 inch (25 millimeters) long by less than approximately 0.5 inches (13 millimeters) in diameter.

14. The valve of claim 1, wherein the fluid valve assembly is approximately 0.75 inches (19 millimeters) long by approximately 0.35 inches (10 millimeters) in diameter.

15. A miniature poppet valve assembly, comprising:

an electromagnetic actuator coil;

an upper pole piece, a lower pole piece having a lower end portion defining a bore and an armature, all of magnetic materials;

the upper and lower pole pieces being permanently joined outside an outer diameter of the actuator coil to form part of the outer case of the valve and to encircle the outer diameter and upper end of the actuator coil with magnetic material;

the armature having a first armature diameter sliding within the bore of the lower end portion of the lower pole piece and into the actuator coil, the armature being configured to slide upward within the bore of the lower end portion of the lower pole piece to a retracted position wherein an upper face of the armature abuts a cooperatively disposed face of the upper pole member;

a plastic valve seat member snap fitted to the lower end of the lower pole piece, the valve seat member defining a valve seat facing a lower end of the armature and defining a first port there through, the valve seat member also defining at least one second port;

the lower end of the armature having a polymeric valve closure member connected thereto and projecting downward to engage and seal with respect to the valve seat when the armature is in an extended position;

a return spring disposed between the armature and the lower pole piece and preloaded to encourage the armature towards the extended position with the valve closure member engaging and sealing against the valve seat; and, an electrical connector coupled to the electromagnetic actuator coil and molded into the top of the upper pole piece.

16. The valve of claim 15 wherein the polymeric valve closure member is retained in the armature.

17. The valve of claim 15 wherein the polymeric valve closure member is an O-ring retained by an extension of the armature.

18. The valve of claim 15, wherein the upper and lower pole pieces are press fitted together.

19. The valve of claim 15, wherein the upper and lower pole pieces are bonded together.

20. The valve of claim 15, wherein the upper and lower pole pieces are press fitted and bonded together.

21. The valve of claim 15, wherein the valve seat member is formed from a durable plastic material.

22. The valve of claim 15, wherein the return spring, when the armature is in the extended position, has a spring force greater than needed to keep the polymeric valve closure member engaging the valve seat against differential fluid pressures across the valve seat during use, and when in the retracted position, a spring force less than the force resulting from residual magnetism in the upper and lower pole pieces and the armature, allowing the armature to magnetically latch in the armature retracted position.

23. The valve of claim 15, wherein the upper pole piece, the lower pole piece and the armature are formed from 4140 steel alloy material.

24. The valve of claim 15, wherein the fluid valve assembly is less than approximately 1 inch (25 millimeters) long by less than approximately 0.5 inches (13 millimeters) in diameter.

25. The valve of claim 15, wherein the fluid valve assembly is approximately 0.75 inches (19 millimeters) long by approximately 0.35 inches (10 millimeters) in diameter.

* * * * *